United States Patent [19]

Ainbinder et al.

[11] 4,386,217

[45] May 31, 1983

[54] OXIDATIVE ALKOXYCARBONYLATION OF OLEFINS WITH PALLADIUM/HETEROPOLY ACID CATALYST SYSTEMS

[75] Inventors: Zarah Ainbinder; George W. Parshall, both of Wilmington, Del.

[73] Assignee: E. I. Du Pont de Nemours and Company, Wilmington, Del.

[21] Appl. No.: 265,908

[22] Filed: May 21, 1981

[51] Int. Cl.³ .............................................. C07C 67/38
[52] U.S. Cl. .................................. 560/207; 252/429 R
[58] Field of Search .............................. 560/207, 206

[56] References Cited

U.S. PATENT DOCUMENTS

| | | | |
|---|---|---|---|
| 3,397,225 | 8/1968 | Fenton | 260/486 |
| 3,397,226 | 8/1968 | Fenton | 260/486 |
| 3,530,168 | 9/1970 | Biale | 260/486 |
| 3,876,694 | 4/1975 | Gaenzler et al. | 260/533 A |
| 3,907,882 | 9/1975 | Gaenzler et al. | 260/533 A |
| 4,039,572 | 8/1977 | Funakoshi et al. | 560/207 |

FOREIGN PATENT DOCUMENTS

| | | |
|---|---|---|
| 2456113 | 6/1975 | Fed. Rep. of Germany. |
| 1025679 | 4/1966 | United Kingdom. |
| 1508331 | 4/1978 | United Kingdom. |

OTHER PUBLICATIONS

Tsigdinos, G. A., *Ind. Eng. Chem., Prod. Res. Develop.*, 13:4, 267 (1974).

Tsigdinos, G. A. and Hallada, C. J., *Inorg. Chem.*, 7:3, 437 (1968).

U.S. Pat. application Ser. No. 215,711, 4/22/81, Lindsey et al.

*Primary Examiner*—Natalie Trousof
*Assistant Examiner*—L. Hendriksen

[57] ABSTRACT

Process for the oxidative alkoxycarbonylation of olefins with palladium/heteropoly acid catalyst systems.

7 Claims, No Drawings

4,386,217

OXIDATIVE ALKOXYCARBONYLATION OF OLEFINS WITH PALLADIUM/HETEROPOLY ACID CATALYST SYSTEMS

TECHNICAL FIELD

This invention relates to a process for oxidative alkoxycarbonylation of olefins with palladium/heteropoly acid catalyst systems.

BACKGROUND INFORMATION

Oxidative alkoxycarbonylation of olefins, such as the reaction of ethylene or propylene with carbon monoxide and an alcohol in the presence of a palladium(II) compound and an inorganic oxidizing agent, is disclosed in U.S. Pat. Nos. 3,397,225, 3,397,226, 3,530,168, 3,876,694 and 3,907,882. It is believed that in these reactions, the palladium(II) is reduced to palladium(O) and, in a single cycle, oxidized by the inorganic oxidizing agent. The inorganic oxidizing agent can be oxidized with molecular oxygen. A problem with such processes is that the inorganic oxidizing agent, typically a copper halide, may be highly corrosive.

In a catalyst system involving a precious metal like palladium, it is desirable to achieve high catalyst efficiency to permit use of a low concentration of the precious metal. One measure of catalyst efficiency is "palladium turnover", i.e., moles of useful products per gram-atom of palladium in the catalyst. By "useful products" is meant those products, in the oxidative alkoxycarbonylation of olefins, which are commercially desirable, i.e., other than undesirable byproducts. It is apparent that characterization of products as useful depends upon the particular needs of those performing the reaction. It is further apparent that the carbon content and structure of the useful products will vary depending upon the reactants. When the olefin subjected to oxidative alkoxycarbonylation in the presence of an appropriate catalyst is a butene, and the other reactants are methanol, carbon monoxide, and oxygen, products which for purposes of this disclosure are characterized as useful products are methyl pentenoates and methyl 3-methoxy-pentanoate, hereinafter referred to as methyl β-methoxyvalerate. Methyl β-methoxyvalerate is readily converted to methyl 2-pentenoate in a separate process by the method of Weizmann et al., j. Am. Chem. Soc., 70, 1153 (1948). Methyl pentenoates are characterized as useful because they can be converted by further carbonylation in a separate process to dimethyl adipate which is readily converted to adipic acid for the production of polyamides.

It has been found that use of a palladium/heteropoly acid catalyst system for the oxidative alkoxycarbonylation of olefins allows achievement of high palladium turnover with a noncorrosive catalyst system.

It is an object of this invention to provide a catalytic process for the oxidative alkoxycarbonylation of olefins with a palladium/heteropoly acid catalyst system.

It is a specific object of this invention to provide a palladium/heteropoly acid catalyzed process for the oxidative alkoxycarbonylation of 1-butene to methyl pentenoates and/or methyl β-methoxyvalerate, which process can be carried out using a low concentration of palladium. Other objects will become apparent hereinafter.

DISCLOSURE OF INVENTION

For further comprehension of the invention and of the objects and advantages thereof reference may be made to the following description and to the appended claims in which the various novel features of the invention are more particularly set forth.

The invention resides in a catalytic process for the oxidative alkoxycarbonylation of olefins, in which one or more olefins, a primary or secondary alcohol, carbon monoxide, and oxygen are contacted and reacted in the presence of a palladium(II) compound and more than about 10 moles of a heteropoly acid per gram-atom of palladium at a temperature greater than about 40° C. The process must include the contacting and reacting of at least the aforesaid reactants. The use of additional materials in the reaction mixture, such as dehydrating agents, other oxidizing agents and organic solvents, provided these do not substantially adversely affect the reaction, is not precluded. The invention includes reactions carried out in batch, continuous, or semi-continuous manners; moreover, the reaction can be carried out in a single step or in successive steps.

The heteropoly acid component of the catalyst system, hereinafter referred to as "HPA," is of the formula:

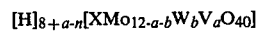

$$[H]_{8+a-n}[XMo_{12-a-b}W_bV_aO_{40}]$$

wherein:
X is an element selected from the group consisting of P, Si, As, Ge, Ti and Zr;
n is the oxidation state, i.e., the formal valence, of X and, therefore, is 5 when X is P or As and 4 when X is Si, Ge, Ti or Zr;
a is 0 to about 4;
b is 0 to about 12;

Preferably, X is P. Because it is difficult to prepare the HPA wherein a is greater than about 3, particularly when 12-a-b is greater than 0, a is usually 0 to about 3. The HPA must have an oxidation potential greater than that of the palladium(II).

The HPA may be comprised of a mixture of compositions in which the numbers of peripheral atoms vary slightly. Therefore, the values of a and b frequently appear as fractions of whole numbers. The HPA is usually and conveniently isolated as a hydrate, which can contain as many as 30 or 40 molecules of water of hydration per molecule of HPA. The above formula is meant to include such hydrates.

Any acyclic mono-olefin can be used in the process of the invention. The selection of the olefin depends upon the desired useful products. Olefins of up to about 8 carbon atoms are preferred because of availability. Examples are ethylene, propylene, 1-butene, 2-butene, isobutylene, pentenes, hexenes, heptenes and octenes. Terminal mono-olefins are generally preferred because of their superior reactivity.

The alcohol used in the reaction can be any primary or secondary alcohol, depending upon the desired products. Primary and secondary alkanols of up to about 6 carbon atoms are preferred because of their availability, reactivity, and the ease of isolation of the products. Primary alkanols are more preferred, and of these, methanol and ethanol are especially preferred because of availability and the ease of isolation of the products.

Choice of a palladium(II) compound is not critical. The palladium compound can be a simple salt, such as palladium chloride, palladium bromide, palladium acetate, palladium nitrate, or palladium sulfate. Preferably, the palladium compound is at least slightly soluble in the reaction mixture, e.g., has at least about 0.01 percent by weight, solubility. A preferred palladium(II) compound is bis(benzonitrile)palladium chloride because use of this compound can result in high palladium turnover. Useful palladium compounds include, e.g.:

$[(C_6H_5)_3P]_2PdCl_2$
$[(C_6H_5)_3P]_2Pd(Cl)COCH_3$
$[C_6H_5P(CH_3)_2]_2PdCl_2$
$C_7H_8PdCl_2$
$[(C_6H_5)_2POCH_3]_2PdBr_2$
$[(C_2H_5O)_3P]_2PdCl_2$
$Pd(NO_3)_2$
$[(C_6H_5)_3P]_2Pd_2Cl_4$
$[(C_6H_5)_3As]_2PdCl_2$
$C_8H_{12}PdCl_2$
$Pd(OOCCH_3)_2$
$PdSO_4$
$[(C_6H_5)_3P]_2PdCl(CO_2CH_3)$

In a preferred embodiment, 1-butene, or a mixture of 1-butene with 2-butene and/or isobutylene, is reacted, in the presence of the catalyst system, with methanol, carbon monoxide, and oxygen to give a mixture of methyl pentenoates and/or methyl β-methoxyvalerate.

The amount of HPA used in the process is more than about 10 to about $10^6$ moles per gram-atom of palladium. The preferred amount of HPA, to achieve high palladium turnover, is about $5\times10^2$ to about $1\times10^5$ moles, per gram-atom of palladium.

Palladium can be used in very low concentrations. Usually, it is used in amounts of about $10^{-3}$ to about $10^{-8}$ gram-atom per mole of olefin. The preferred range is about $10^{-5}$ to about $10^{-8}$.

The amount of alcohol is not critical as long as there is enough alcohol present to form the ester. In addition to functioning as a reactant, the alcohol can function as a solvent, particularly for the catalyst system. Usually, the amount of alcohol is about 2 to about 10 times the weight of the olefin, although larger or smaller amounts can be used.

The ratio of the partial pressure of carbon monoxide to oxygen is critical only to the extent that explosive mixtures should be avoided. The $CO/O_2$ partial-pressure ratio, which measures the molar ratio, is usually about 1/1 to about 10/1, although higher or lower partial-pressure ratios can be used as long as explosive mixtures are not formed. The partial-pressure ratio is preferably about 2/1 to about 5/1. The total pressure under reaction conditions is usually about 50 to about 1,000 psi (0.34 to 6.9 MPa), preferably about 100, more preferably about 400, to about 800 psi (0.69, 2.8, to 5.5 MPa).

If desired, an organic dehydrating agent can be present during the reaction, as can an organic solvent (in addition to the alcohol). Typical useful dehydrating agents are acetals, ketones, and ortho esters. A large number of such agents is described in U.S. Pat. No. 4,189,599.

The process is operable over a wide range of temperatures, e.g., greater than about 40° C. to about 200° C., preferably about 75° C. to about 125° C. It has been found that the reaction proceeds at practicable rates above about 75° C. and 100 psi (690 kPa) and these conditions are therefore preferred. The total reaction time is not critical and will vary depending upon the reactants used and the reaction conditions. A typical reaction time is about 12 hrs.

The following detailed procedure is offered as an illustration of a preferred embodiment of the invention.

A mixture of 98 percent pure $NaVO_3$ (31.10 g, 0.25 mol), $Na_2HPO_4.7H_2O$ (10.72 g, 0.04 mol) in $H_2O$ (200 mL) was heated with stirring until a hazy light-yellow solution was obtained. After cooling, the pH of this solution was 8.82; it was adjusted to 3.0 with 5.6 mL conc. $H_2SO_4$ while the temperature of the solution was maintained at 20° C. with the use of an ice bath. The color changed from straw yellow to deep maroon at pH 3.0. A second solution of $Na_2MoO_4.2H_2O$ (67.72 g, 0.28 mol) and $H_2O$ (150 mL) was prepared and combined with the first, causing no color change. The pH of the combined solution was 6.86; it was adjusted to pH 1.0 with 20.1 mL conc. $H_2SO_4$ using an ice bath to maintain the solution temperature at 20° C. An additional 50 mL conc. $H_2SO_4$ was added. The solution became orange-red. After cooling, the solution was extracted with $2\times150$ mL portions of diethyl ether. The HPA-etherate layer was separated and the ether was evaporated. The residue was recrystallized from water, collected on a Buchner funnel, and then placed under vacuum at room temperature overnight to obtain 37.1 g of orange crystals of polyhydrated HPA. The theoretical composition of the HPA, calculated from the amounts of starting materials used, was $H_8[PMo_7V_5O_{40}]$. Analysis: Mo 48.79, V 5.53, $H_2O$ 11.3; corresponds to Mo/V 9.9/2.1 and HPA.12.2 $H_2O$ (i.e., $H_{5.1}PMo_{9.9}V_{2.1}O_{40}.12H_2O$).

A glass liner having a volume of about 200 mL was charged with 50 mL of methanol, 0.1 mL of a solution of bis(benzonitrile)palladium(II) chloride containing $1.3\times10^{-9}$ g-atom Pd, and 0.20 g of the above heteropoly acid. The liner was placed in a 400-mL shaker tube, and the system was cooled, evacuated, and charged with 6 g of 1-butene. The shaker tube was closed and heated to 100° C. while shaking. Over the next 70 min it was pressured four times with 25 psi (0.17 MPa) of oxygen followed by 100 psi (0.69 MPa) of carbon monoxide. The mixture was then reheated to 100° C. and 574–700 psi (3.96–4.83 MPa), with one repressuring with $O_2$ and CO as described above after five hours. The reaction mixture was substantially maintained at 100° C. and 611–700 psi (4.22–4.83 MPa) for a further 6.8 hr, bringing the total reaction time to about 12 hr. The shaker tube was cooled, bled to atmospheric pressure, and opened, and the product mixture was analyzed by gas chromatography (GC).

Reproduction of results achieved in carrying out the invention may be difficult under laboratory conditions, a fact common to reactions of this type. In a large number of reactions carried out with buteness, methanol and a variety of heteropoly acids, in accordance with the invention and substantially as described above, a wide range of palladium turnover was achieved, even under similar conditions. Nevertheless, it was found that, broadly speaking, a low amount of palladium relative to the amounts of HPA and olefin resulted in higher palladium turnover. For example, in 51 reactions in which the preferred temperature, pressure, olefin and relative amounts of HPA, olefin and palladium were used (actual conditions were 100° C., 4.1 to 4.8 MPa, $9.3\times10^2$ to $9.5\times10^4$ moles of HPA per gram-atom of palladium and $8.2\times10^{-5}$ to $8.2\times10^{-7}$ gram-atom of palladium per mole of olefin), palladium turnover varied from about 150 to about $3.5\times10^6$, the average being about $9.0\times10^4$.

In 86 other reactions in which the temperature, pressure and olefin, but not the relative amounts of HPA, olefin and palladium were within the preferred ranges (actual conditions were 100° C., 0.69 to 4.8 MPa, 29 to $10^3$ moles of HPA per gram atom of palladium and $2.3\times10^{-3}$ to $8.2\times10^{-5}$ gram atom of palladium per mole of olefin), palladium turnover varied from about 20 to about $4.0\times10^3$, the average being about $3.5\times10^2$.

Conversion in all reactions carried out in accordance with the invention varied up to about 8 mole percent. The above-noted reactions were carried out in succession; some difficulty in cleansing the reaction vessel after each reaction was encountered as several control experiments in which no palladium was added resulted in some useful products being produced.

It is believed that the above and below-noted reactions demonstrate that the process of the invention is useful to achieve high palladium turnover and that by strictly controlling reactions carried out in accordance with the invention, more uniform results are likely to be obtained.

The following examples, which are illustrative of the invention but not necessarily of preferred embodiments thereof, are listed to show the use of various HPAs and palladium compounds under various pressures and $CO/O_2$ ratios. HPAs were prepared substantially as described above or as described in Tsigdinos and Hallada, Inorg. Chem., 7, 437 (1968). The reaction was carried out substantially as described above. The temperature was 100° C., the alcohol was methanol and, except where indicated, the olefin was 1-butene. Other conditions and results are summarized in the following Table. Where HPAs are reported (theoretical compositions) the palladium compound was $(C_6H_5CN)_2PdCl_2$; where palladium compounds are reported, the HPA was $H_8PMo_7V_5O_{40}$. The results reported are not necessarily dependent upon the conditions reported except as discussed above.

pentenoates which can in turn be converted to dimethyl adipate and then to adipic acid, a reactant in the industrial production of polyamides.

While the preferred embodiments of the invention are described by the above, it is to be understood that the invention is not limited to the precise construction herein disclosed and that the right is reserved to all changes and modifications coming within the scope of the invention as defined in the following claims.

We claim:
1. Catalytic process for the oxidative alkoxycarbonylation of olefins, in which one or more olefins, a primary or secondary alcohol, carbon monoxide, and oxygen are contacted and reacted in the presence of a palladium(II) compound and a heteropoly acid, said heteropoly acid having the formula

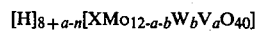

$[H]_{8+a-n}[XMo_{12-a-b}W_bV_aO_{40}]$ wherein:
X is an element selected from the group consisting of P, Si, As, Ge, Ti and Zr;
n is the oxidation state of X;
a is 0 to about 4;
b is 0 to about 12;
at a temperature greater than about 40° C., wherein the process the amount of palladium is about $10^{-5}$ to about $10^{-8}$ gram-atom per mole of olefin and the amount of heteropoly acid is about $5\times10^2$ to about $1\times10^5$ moles per gram-atom of palladium.

2. The process of claim 1 wherein a is 0 to about 3.
3. The process of claim 1 wherein the olefin is a butene, the alcohol is methanol, X is phosphorus and the palladium(II) compound is bis(benzonitrile)-palladium chloride.
4. The process of claim 3 wherein the olefin is 1-butene.
5. The process of claim 3 wherein the olefin com-

| Ex. | HPA/ Palladium Compound | Moles olefin/ Moles HPA/ G-atm. Pd | Moles CO/ Mole $O_2$ | Total Press. (MPa) | Palladium turnover |
|---|---|---|---|---|---|
| 1 | $H_{13}PMo_2V_{10}O_{40}$ | $21 \times 10^5/10^4$ | 4 | 4.83 | 12,300 |
| 2 | $H_9PMo_4W_2V_6O_{40}$ | $39 \times 10^2/74$ | 2 | 1.38 | 160 |
| 3 | $H_3PMo_{12}O_{40}$ | $76 \times 10^2/57$ | 2 | 1.03 | 90 |
| 4[1] | $H_8PMo_7V_5O_{40}$ | $19.5 \times 10^3/136$ | 4 | 4.48 | 570 |
| 5[2] | $H_8PMo_7V_5O_{40}$ | $17 \times 10^3/121$ | 4 | 4.48 | 280 |
| 6[3] | $H_8PMo_7V_5O_{40}$ | $82 \times 10^2/140$ | 4 | 4.65 | 260 |
| 7 | $H_8PW_7V_5O_{40}$ | $82 \times 10^4/10^3$ | 4 | 4.83 | 14,500 |
| 8 | $H_3PW_{12}O_{40}$ | $58 \times 10^2/46$ | 2 | 1.10 | 24 |
| 9 | $H_4SiMo_{12}O_{40}$ | $82 \times 10^3/994$ | 4 | 4.21 | 940 |
| 10 | $H_{10}SiMo_6V_6O_{40}$ | $82 \times 10^4/10^3$ | 4 | 4.83 | 490 |
| 11 | $H_4SiW_{12}O_{40}$ | $69 \times 10^2/59$ | 2 | 1.17 | 150 |
| 12 | $[(C_6H_5)_2POCH_3]_2PdBr_2$ | $42 \times 10^2/76$ | 2 | 1.10 | 130 |
| 13 | $Pd(NO_3)_2$ | $12 \times 10^2/21$ | 2 | 1.21 | 80 |
| 14 | $(C_6H_5As)_2PdCl_2$ | $15.5 \times 10^2/110$ | 4 | 2.90 | 390 |
| 15 | $PdSO_4$ | $82 \times 10^2/149$ | 4 | 4.55 | 400 |
| 16 | $H_8PMo_7V_5O_{40}$ | $82 \times 10^4/10^3$ | 19 | 4.48 | 4,650 |

[1,2,3]The olefins were trans-2- and cis-2-butene, and isobutylene, respectively.

BEST MODE FOR CARRYING OUT THE INVENTION

The best mode for carrying out the invention is described in the illustrative detailed procedure given above.

INDUSTRIAL APPLICABILITY

The process of the invention has industrial applicability in the conversion of olefins to useful products. For example, it can be used to convert butenes to methyl prises a mixture of 1-butene and 2-butene and/or isobutylene.

6. The process of claims 3, 4 or 5 wherein the temperature is at least about 75° C. and the reaction is carried out at a total pressure of at least about 100 psi (0.69 MPa).

7. The process of claim 6 wherein the reaction is carried out at a total pressure of at least about 400 psi (2.8 MPa).

* * * * *